(No Model.)

J. McMAHON.
WHEEL CULTIVATOR.

No. 451,443. Patented Apr. 28, 1891.

Witnesses:
Walter S. Hood
Belle C. Freeman.

Inventor
James McMahon
By Lucius C. West
Atty

UNITED STATES PATENT OFFICE.

JAMES McMAHON, OF KALAMAZOO, MICHIGAN, ASSIGNOR TO THE D. C. & H. C. REED & COMPANY, OF SAME PLACE.

WHEEL-CULTIVATOR.

SPECIFICATION forming part of Letters Patent No. 451,443, dated April 28, 1891.

Application filed February 15, 1890. Renewed January 24, 1891. Serial No. 378,881. (No model.)

*To all whom it may concern:*

Be it known that I, JAMES MCMAHON, a subject of the Queen of Great Britain, residing at Kalamazoo, county of Kalamazoo, State of Michigan, have invented a new and useful Wheeled Cultivator, of which the following is a specification.

This invention relates to that class of wheeled cultivators in which different frames for supporting the teeth are employed, said frames being pivoted to a suitable support at the forward end, said style of cultivators being designed for field cultivation or, by taking out the center frame, for cultivating corn. Only one frame is here shown, or rather the beam, to the rear end of which the frame is attached in the full-size construction.

The object of the invention consists in the below described and claimed peculiarities of construction and combination of parts in relation to the frame-beams and the forward bails, to which they are pivoted.

A further object consists in a peculiar construction whereby the axle of the wheeled cultivator can be adjusted to make it longer or shorter, and thus make the cultivator wider or narrower, according to the use to which the implement is put—viz., whether cultivating corn or similar vegetation, or whether cultivating a field preparatory to seeding.

Figure 1:
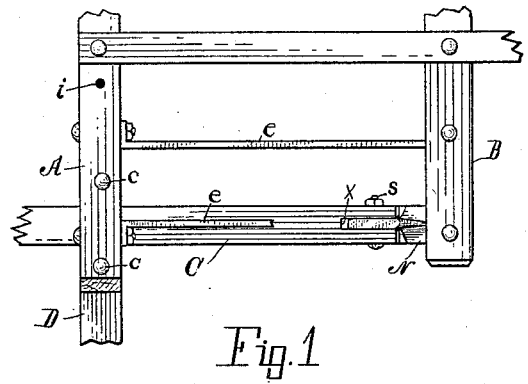
Figure 2:
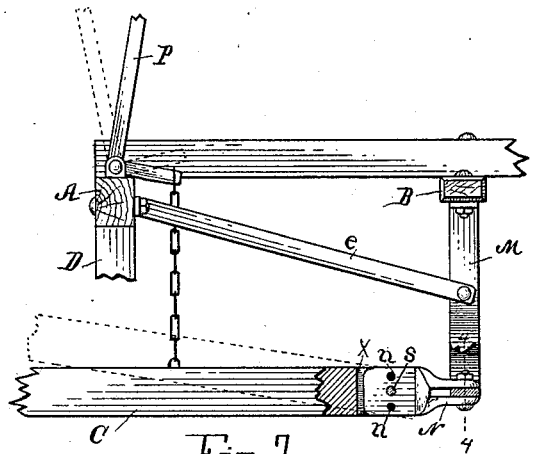
Figure 3:
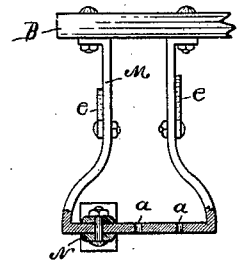
Figure 4:
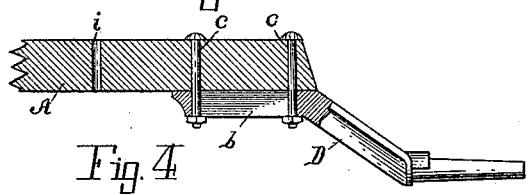
Figure 5:
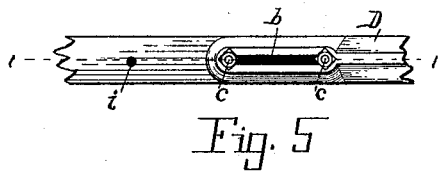

In the drawings forming a part of this specification, Figure 1 is a plan view of Fig. 2. Fig. 2 is a side elevation of Fig. 1, parts being broken away. Fig. 3 is a front elevation of lettered details in Fig. 2, parts being in section on line 4 4 in said latter-named figure. Fig. 4 shows an elevation of one end of the axle, parts being in section on line 1 1 in Fig. 5; and Fig. 5 is an inverted plan of Fig. 4.

Referring to the lettered parts of the drawings, B shows the front beam of the wheeled frame. Attached to this beam and pendent therefrom are stirrups M, which stirrups are braced from the axle by bars *e e*. As many of these stirrups are employed as needed, according to the number of tooth-frames in the cultivator, said frames being attached to the bottom of said stirrups M, Figs. 1, 2, and 3. They are pivoted at the front end to one of a series of holes *a* in the bottom of said bail, so as to swing laterally. When cultivating corn, the tooth-frames, one on each side of the cultivator, (only one side being here shown,) are attached at the inner side of said stirrups, as in Fig. 3. When a center section is put in to prepare the implement for cultivating a field, the two side sections are moved outward according to the distance desired by pivoting the end N in another one of the holes *a*. The end N consists of a casting provided with a tongue X X, Figs. 1 and 2. The tongue end of said casting is provided with one or more transverse holes *n*, and the wooden beam of the tooth-frame C is provided with a vertical slot, in which the tongue X of the end casting N is pivotally attached by a pivot S. Thus the tooth-frames are enabled to be swung laterally on their pivotal connection with the stirrups and to play vertically on the pivot S.

At P is a lever for raising and lowering the tooth-frames in the ordinary manner.

The object of having more than one hole *n* in the tongue of the casting N is in order that the front end of the tooth-frame may be adjusted higher or lower, as desired.

The axle A of the cultivator is adjustable lengthwise to make it longer or shorter, according to the width of the cultivator in its given uses for field cultivating or for cultivating corn or other vegetation grown in rows. The parts of the axle to which the wheels are attached (wheels not here shown) consist of castings D, adjustably attached to the part A, one at each end thereof, one end being shown in Figs. 4 and 5 by the bolts *c c*, passed up through the elongated slot *b* of said castings D, and up through holes *i* in the part A of said axle. These holes *i* are so spaced that by taking out the outer bolt *c* the casting D can be slid inwardly and cause the inner end of the slot *b* to register with the third one of the holes *i*. Then the bolt is inserted through said hole and end of the slot. This binds the parts securely together and necessitates the removal of only one of the bolts at each end of the axle to accomplish the adjustment.

Adjustable axles in wheeled cultivators are not new *per se;* but so far as I am aware it is new to associate such an axle with my peculiar stirrups and laterally-adjustable share-frame.

Having thus described my invention, what

I claim as new, and desire to secure by Letters Patent of the United States, is—

1. The combination of the wheeled frame, the pendent stirrups having a series of adjusting-holes in the lower bar, the axle to said wheeled frame, said axle being adjustable lengthwise, and the share-frames detachably and adjustably attached to the lower bar of the stirrups, whereby the axle may be lengthened when the side share-frames are adjusted outward, substantially as set forth.

2. In a wheeled cultivator the cultivating part of which is capable of being adjusted wider or narrower, the axle composed of the central part having the three holes in the ends, the end parts which bear the wheels having the elongated slots, and the two bolts for attaching the parts together, substantially as set forth.

In testimony of the foregoing I have hereunto subscribed my name in presence of two witnesses.

JAMES McMAHON.

Witnesses:
MOSES HILL,
J. ROBERTS.